United States Patent
Olson, III et al.

(10) Patent No.: US 7,718,114 B2
(45) Date of Patent: *May 18, 2010

(54) CERAMIC FOAM FILTER FOR BETTER FILTRATION OF MOLTEN IRON

(75) Inventors: Rudolph A. Olson, III, Lafeyette, LA (US); Leonard S. Aubrey, Hendersonville, NC (US); Feng Chi, Greer, SC (US); Christopher J. Plantec, Greenville, SC (US); Myron K. Redden, Hendersonville, NC (US); David P. Haack, Hendersonville, NC (US)

(73) Assignee: Porvair PLC, Norfolk (GB)

( * ) Notice: Subject to any disclaimer, the term of this patent is extended or adjusted under 35 U.S.C. 154(b) by 349 days.

This patent is subject to a terminal disclaimer.

(21) Appl. No.: 11/499,327

(22) Filed: Aug. 4, 2006

(65) Prior Publication Data

US 2006/0266714 A1 Nov. 30, 2006

Related U.S. Application Data

(63) Continuation-in-part of application No. 11/389,841, filed on Mar. 27, 2006.

(60) Provisional application No. 60/706,577, filed on Aug. 9, 2005, provisional application No. 60/665,760, filed on Mar. 28, 2005.

(51) Int. Cl.
*C21C 7/00* (2006.01)
*C22B 9/02* (2006.01)

(52) U.S. Cl. .......................... 266/227; 210/660; 75/407
(58) Field of Classification Search ................. 266/227; 210/660; 75/407
See application file for complete search history.

(56) References Cited

U.S. PATENT DOCUMENTS

| | | | | |
|---|---|---|---|---|
| 4,024,212 | A * | 5/1977 | Dore et al. | 264/44 |
| 4,056,586 | A | 11/1977 | Pryor et al. | |
| 4,664,704 | A | 5/1987 | Dohnomoto et al. | 75/229 |
| 4,975,191 | A | 12/1990 | Brockmeyer et al. | 210/510.1 |
| 5,190,897 | A * | 3/1993 | Azumi | 501/81 |
| 5,456,833 | A | 10/1995 | Butcher | 210/488 |
| 5,673,902 | A | 10/1997 | Aubrey | 266/229 |
| 6,210,612 | B1 * | 4/2001 | Pickrell et al. | 264/44 |
| 6,245,698 | B1 * | 6/2001 | Pope et al. | 501/12 |
| 6,663,776 | B2 * | 12/2003 | Hoffman et al. | 210/510.1 |
| 6,773,825 | B2 | 8/2004 | Pickrell et al. | 428/566 |
| 2002/0179523 | A1 * | 12/2002 | Quackenbush | 210/510.1 |
| 2004/0099611 | A1 * | 5/2004 | Olson et al. | 210/767 |

* cited by examiner

*Primary Examiner*—Melvin C Mayes
*Assistant Examiner*—James Corno
(74) *Attorney, Agent, or Firm*—Joseph T. Guy; Nexsen Pruet, LLC (57) ABSTRACT

A ceramic precursor, and ceramic filter prepared therewith, with 35-70 wt % refractory aluminosilicate; 10-30 wt % colloidal silica; 0-2 wt % modified bentonite; 0-35 wt % fumed silica; 0-10 wt % pore formers and liquid.

16 Claims, 6 Drawing Sheets

CERAMIC FOAM FILTER FOR BETTER FILTRATION OF MOLTEN IRON

CROSS-REFERENCE TO RELATED APPLICATIONS

The present application claims priority to U.S. Provisional Application No. 60/706,577 filed Aug. 9, 2005 which is incorporated herein by reference. The present application is a continuation-in-part of pending U.S. patent application Ser. No. 11/389,841 filed Mar. 27, 2006 which claims priority to U.S. Provisional Application No. 60/665,760, filed Mar. 28, 2005 both of which are incorporated herein by reference.

BACKGROUND

The present invention is related to an improved ceramic foam filter. More particularly, the present invention is related to a ceramic foam filter for molten iron with sufficient mechanical properties for use in capturing and retaining high FeO liquid slags, other metal oxide slags, and other entrained particulates.

A significant portion of iron foundries use pressed or extruded mullite strainers. A ceramic foam filter is expected to perform better than a strainer due to its tortuous fluid flow path, but mullite strainers perform better than would be expected in ductile iron applications considering the strainers straight-through flow configuration. It is hypothesized that liquid slag in the molten ductile iron wets the surface of mullite better than it wets SiC. Mullite filters may better retain liquid slag during filtration but mullite foam filters for foundry applications have been unavailable.

Slag retention is difficult in strainer-type filters. Liquid inclusions, even though they readily wet the mullite strainer material, are very easily deformable by the flowing molten iron and simply flow down the filter wall to the exit. Oftentimes strainers act to coalesce numerous small slag inclusions (non critical size) and release them back into the flowing iron as a larger inclusion.

The state of the art for silica-bonded SiC foam filters used for molten iron filtration is described in U.S. Pat. No. 6,663,776. The filter described therein produces the highest high temperature strength commercially known for this particular type of filter. There are many companies that manufacture silica-bonded SiC filters for the iron industry because it is fairly easy to make a relatively robust filter of this type. During firing, the SiC grain in the body is believed to partially oxidize to silica glass. The silica glass allows the SiC grain to bond well with the silica binder matrix thereby creating a relatively robust foam. In the pouring of iron castings, particularly ductile iron, a high FeO liquid slag is formed. The high FeO slag does not wet SiC foam filters due to a carbothermic reaction between the carbon constituent of SiC grain and the graphite impurities in the SiC. The FeO slag reacts and CO gas forms at the slag-filter interface, preventing the slag from wetting and adhering to the filter.

Substituting SiC with mullite has proven to be elusive and proper design of the binder for formulation of a filter with the appropriate mechanical properties at both room and high temperature has not been previously discovered. Thus, one could fairly easily make an acceptable SiC filter even when using a substandard matrix design, but not with mullite. A mullite filter with sufficient strength for liquid iron filtration has heretofore alluded researchers.

SUMMARY OF THE INVENTION

It is an object of the present invention to provide a mullite foam wherein the wetting characteristics in iron is utilized within the tortuous path of the foam to produce a filter which is superior to either silica-bonded SiC foam or mullite strainers, creating cleaner, more machineable iron castings.

It is another object of the present invention to provide an improved method for filtering iron.

It is another object of the present invention to provide a filter with improved wettability to FeO, improved thermal shock resistance and a tortuous flow path.

Provided herein is a ceramic precursor. The ceramic precursor has 35-70 wt % refractory aluminosilicate; 10-30 wt % colloidal silica; 0-2 wt % modified bentonite; 0-35 wt % fumed silica; 0-10 wt % pore former and solvent.

Also provided herein is a ceramic filter prepared by the method of preparing a ceramic slurry precursor. The ceramic precursor has 35-70 wt % refractory aluminosilicate; 10-30 wt % colloidal silica; 0-2 wt % modified bentonite; 0-35 wt % fumed silica; 0-10 wt % pore former and solvent. An organic foam is impregnated with the ceramic precursor. The impregnated organic foam is heated to a temperature sufficient to volatilize the organic foam and pore former and to sinter the ceramic precursor.

Also provided herein is a process for filtering molten iron. The process includes preparing a ceramic foam filter. The filter is prepared by preparing a ceramic precursor with 35-70 wt % refractory aluminosilicate; 10-30 wt % colloidal silica; 0-2 wt % modified bentonite; 0-35 wt % fuming silica; 0-10 wt % pore former and solvent. An organic foam is impregnated with the ceramic precursor followed by heating the impregnated organic foam to a temperature sufficient to volatilize the organic foam and pore former and to sinter the ceramic precursor to form a filter. Molten iron is passed through the filter wherein FeO slag is retained by the filter.

DETAILED DESCRIPTION

The invention provides a silica-bonded mullite filter with sufficient strength, at both ambient and high temperature, and sufficient thermal shock resistance and a method for making the filter. The invention also provides an improved method of filtering molten metal.

Figure 1:
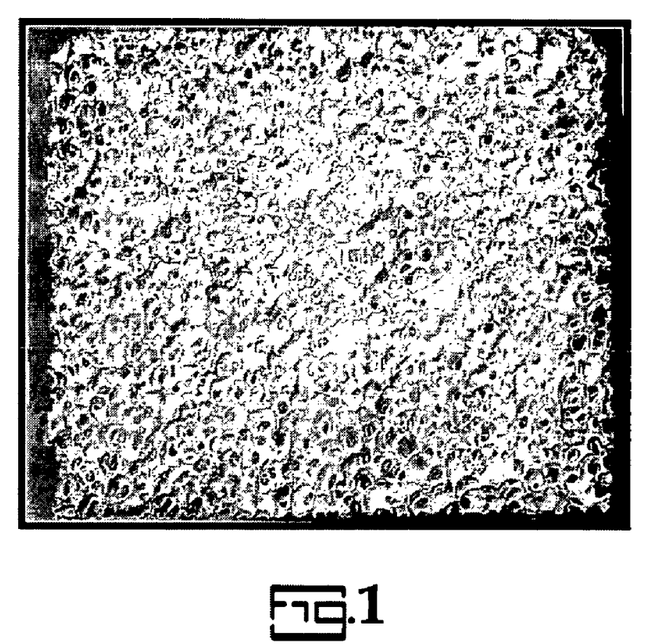
FIG. 1 is a macroscopic view of a filter of the present invention.

The filter is made via the foam replication technique, which is a common method used to manufacture reticulated ceramic foam for use as molten metal filtration devices. In the process, polyurethane foam is coated with ceramic slurry, then dried and fired. During firing, the polyurethane foam within the ceramic coating vaporizes, but the ceramic structure remains, resulting in an exoskeleton-like ceramic foam having hollow voids where the polyurethane once resided. FIG. 1 provides a macroscopic image of ceramic foam. The structure is essentially a connection of struts with porosity residing around and within these struts.

In preparing a ceramic filter, foam is impregnated with ceramic slurry. The ceramic slurry is then dried, the foam is vaporized and the ceramic is sintered. The process for forming a ceramic filter is provided in U.S. Pat. Nos. 4,056,586; 5,456,833 and 5,673,902 each of which are incorporated herein by reference.

The slurry employed depends on the desired ceramic material for the chosen application. One must have sufficient properties in the final product to withstand the particular application with respect to chemical attack and must have sufficient structural and/or mechanical strength to stand up to the particular elevated temperature conditions. In addition, the slurry should have a relatively high degree of fluidity and be comprised of an aqueous suspension of the ceramic intended for use in the filter. Normally, the slurry contains water. Additives, such as binders and surfactants, may be employed in the slurry.

The flexible foam material is impregnated with the aqueous ceramic slurry so that the fiber-like webs are coated therewith and the voids are filled therewith. Normally, it is preferred to repeatedly immerse the foam in the slurry and compress the foam between immersions to insure complete impregnation of the foam.

The impregnated foam is preferably compressed to expel from 25 to 75% of the slurry while leaving the fiber-like web portion coated therewith. In a continuous operation, one may pass the impregnated foam through a preset roller to affect the desired expulsion of slurry from the foam and leave the desired amount impregnated therein. This may be done manually by simply squeezing the flexible foam material to the desired extent. At this stage, the foam is still flexible and may be formed into configurations suitable for the specific filtration task, i.e., into curved plates, hollow cylinders, etc. It is necessary to hold the formed foam in position by conventional means until the polymeric substrate is decomposed, or preferably until the ceramic is sintered. The impregnated foam is then dried by either air drying or accelerated drying at a temperature of from 35° to 700° C. for from 2 minutes to 6 hours. After drying, the material is heated at an elevated temperature to bond the ceramic particles making up the fiber-like webs. It is preferred to heat the dried impregnated material in two stages, with the first stage being to heat to a temperature of from 350° to 700° C. and holding within this temperature range for from 2 minutes to 6 hours in order to burn off or volatilize the web of flexible foam. Clearly this step can be part of the drying cycle, if desired. The second stage is to heat to a temperature of from 900° to 1700° C. and hold within that temperature range for from 2 minutes to 10 hours in order to bond the ceramic. The resulting product is a fused ceramic foam having an open cell structure characterized by a plurality of interconnected voids surrounded by a web of the ceramic. The ceramic foam may have any desired configuration based on the configuration needed for the particular molten metal filtration process.

The process for forming the inventive filter comprises forming a slurry of ceramic precursors. For the purposes of the present invention ceramic precursors include specific ratios of refractory aluminosilicate, colloidal silica, fumed or fused silica and modified bentonite. The slurry may comprise a surfactant to decrease the surface tension of the aqueous phase to below 80 mN/m for improved wetting characteristics.

The term "refractory aluminosilicate" as used herein refers to refractory raw materials that comprise predominantly mullite and which possess a pyrometric cone equivalent (PCE) of at least 20. This class of raw materials is also known in the refractory materials literature by the synonyms calcined fireclay, calcined aggregate, refractory calcines, mullite calcines, refractory aggregates, calcined kyanite, electrofused mullite and chamottes.

The ceramic precursor of the present invention comprises about 35-70 wt % refractory aluminosilicate, about 10-30 wt % colloidal silica, about 0 to 2 wt % bentonite or modified bentonite which has a polymeric rheology modifier added, about 0 to 35 wt % fumed or fused silica and about 0-10 wt % pore former with the balance being a solvent, preferably water, present in a sufficient amount to allow the composition to flow into the foam. About 5-8 wt % water is particularly preferred as the solvent. More preferably, the ceramic composition comprises 40-60 wt % and most preferably 50-60 wt % refractory aluminosilicate. Below about 40 wt % refractory aluminosilicate the FeO may not adequately wet the interior surfaces of the filter to allow wicking into the interstices where it is retained. Filters made with less than 50 wt % refractory aluminosilicate may also be more sensitive to thermal shock in application. Above about 60 wt % refractory aluminosilicate the filter strength is compromised. More preferably the ceramic precursor comprises 10-23 wt % colloidal silica. More preferably the ceramic precursor comprises about 0.6 to 1.5 wt % bentonite or modified bentonite and most preferably about 0.8 wt % bentonite or modified bentonite. More preferably, the ceramic precursor comprises about 10-20 wt % fumed silica. Fumed and fused silica can be used interchangeably in the present invention in any ratio up to the total amount of fumed or fused silica as set forth herein.

The resulting filter provides a hot MOR, measured at 1,428° C., of 20 to 80 psi at an average relative density of about 14%.

The density of the resulting filter is preferably at least 8 wt % of theoretical density to no more than 18 wt % of theoretical density. Above 18 wt % of theoretical density the filtering rate is to slow to be effective. Below 8 wt % of theoretical density the strength of the filter is insufficient for use in filtering molten iron.

Refractory aluminosilicate is a naturally occurring material with a nominal composition of $3Al_2O_3 \cdot 2SiO_2$. In practice refractory aluminosilicate comprises from about 45 wt % to 70 wt % $Al_2O_3$ and about 25 wt % to about 50 wt % $SiO_2$. Naturally occurring impurities are present and one of skill in the art would realize that completely removing the impurities is cost prohibitive. In practice, refractory aluminosilicate has about 1.5-3 wt % $TiO_2$, up to about 1.5 wt % $Fe_2O_3$, up to about 0.06 wt % CaO, up to about 0.8 wt % MgO, up to about 0.09 wt % $Na_2O$, up to about 0.9 wt % $K_2O$ and up to about 0.12 wt % $P_2O_5$. For the purposes of the present invention the preferred refractory aluminosilicates are Mulcoa 47®, Mulcoa 60® and Mulcoa 70® all available from C-E Minerals of Americus, GA but any commercially available refractory aluminosilicate powder is suitable to the application.

It is preferable to add volatile organic materials into the ceramic slurry to further increase the porosity.

In an alternative embodiment a ceramic precursor comprising spherically shaped voids therein can be formed into the desired shape of the porous ceramic and fired as described in U.S. Pat. No. 6,773,825 which is incorporated herein by reference thereto.

A mixture of ceramic or metal particles and pliable organic spheres as the pore former is prepared into a liquid, or suspension, and the mixture is formed into a shaped article. The shaped article is dried and fired so that the particles are bonded by sintering. The organic spheres and other organic additives are volatilized. The spheres are preferably low density and more preferably hollow. The size of the voids may be preselected by selecting the appropriate polymer spheres. The porosity is also easily controlled by the number of polymer spheres added. It is most preferred that the polymer spheres are each in contact with at least two other spheres such that a network of voids is created in the eventual diffuser.

To a suspension of ceramic precursor is added pliable organic hollow spheres which are simultaneously suspended in the solvent as a pore former. The ceramic precursor is then incorporated into the foam as described further herein and dried to remove the solvent. When the ceramic precursor is fired to form a ceramic the spheres are volatilized resulting in uniformly distributed voids throughout the filter lattice. Using this method a range of porosities can be achieved, however, for use in molten iron filtration it is preferable that the porosity be no more than 60% due to insufficient thermal stress resistance at higher levels of porosity. The porosity and pore size is easily controlled by the number and sizes of polymer spheres used. After firing the void is substantially the same shape and size as the included sphere. It is most preferably to utilize spheres with an average diameter of 20 to 150 microns and more preferably 20-80 microns. An 80 micro sphere is most preferred. Other organic pore formers may be included including flour, cellulose, starch and the like. Hollow organic spheres are most preferred due to the low volume of organic to pore volume which can be achieved and the minimal level of organic residue remaining after firing. It is most preferred that the slurry comprise up to about 10 wt % pore formers based on an 80 micron hollow sphere.

The material is either formed to size or cut to size. The material can be cut to size as a green ceramic or as a sintered ceramic.

EXAMPLES

Example 1

A ceramic precursor composition was prepared utilizing the materials listed in Table 1. In Table 1, the refractory aluminosilicate used was Mulcoa 60®, ground to a −325 mesh, as available from C-E Minerals. Colloidal silica was used as obtained from Nyacol. Modified bentonite was used as obtained from Wyo-Ben, Inc. Fumed silica was used as obtained from CE Minerals. The composition was fired at 1200° C. for 30 min. Fused silica could substitute for fumed silica to improve the ability to cut the ceramic foam in the fired state. The modulus of rupture was measured at ambient temperature as reported in Table 2. The modulus of rupture was measured at a high temperature as reported in Table 3.

TABLE 1

| Component | Wt % |
| --- | --- |
| refractory aluminosilicate | 54.50 |
| colloidal silica | 21.00 |
| modified bentonite | 0.75 |
| Fumed silica | 17.75 |
| water | 6.00 |

The average room temperature modulus of rupture (MOR) of the filter is approximately 90-psi over the given density range. This value is acceptable for most molten metal filtration applications.

TABLE 2

Room temperature MOR

| Density (%) | MOR (psi) |
| --- | --- |
| 15.7 | 95.1 |
| 13.3 | 77.1 |
| 14.0 | 115.0 |
| 13.4 | 96.5 |
| 15.3 | 107.4 |
| 14.0 | 85.5 |
| 13.1 | 78.4 |
| 13.9 | 99.3 |
| 14.9 | 83.8 |
| 15.0 | 94.0 |
| Avg. 14.3 | Avg. 93.2 |

To measure the hot MOR of silica bonded mullite ceramic foam filters room temperature samples were inserted directly into a furnace held at 1428° C., then tested in three-point bend configuration about 45 seconds after the filter was inserted. This test is analogous to the conditions the filter is subjected to during iron filtration. The results are reported in Table 3.

TABLE 3

Hot MOR

| Density % | MOR (psi) |
| --- | --- |
| 15.0 | 51.5 |
| 15.2 | 51.9 |
| 15.3 | 40.3 |
| 14.2 | 30.1 |
| 15.3 | 19.8 |
| 15.0 | 33.1 |
| 15.4 | 15.7 |
| 15.6 | 29.2 |
| 15.6 | 36.3 |
| 13.4 | 28.0 |
| Avg. 15.0 | Avg. 31.6 |

Example 2

Figure 2:
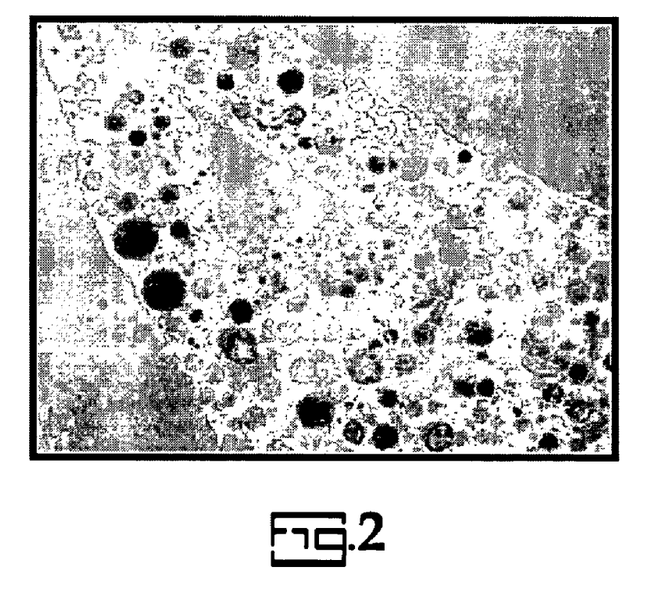
FIG. 2 is an electron microscopic view of a filter of the present invention taken at 50× magnification.

To improve liquid slag retention and capacity a composition was prepared as in Table 1 with the further inclusion of 4 wt % hollow organic spheres with a diameter of 80 μm. The resulting filter was examined under an electron microscope and the resulting microstructure is shown in FIG. 2. When the liquid slag wets the mullite body, it can be drawn into the micropores via capillary action.

Example 3

A filter was prepared under the same conditions as Example 1 with the composition provided in Table 4. Mulcoa 70® was used as the refractory aluminosilicate as available from C-E Minerals.

TABLE 4

| Component | Wt % |
| --- | --- |
| Refractory aluminosilicate | 54.5 |
| colloidal silica | 21.0 |
| modified bentonite | 0.8 |

TABLE 4-continued

| Component | Wt % |
|---|---|
| silica fume | 17.8 |
| water | 5.9 |

The resulting average hot MOR was measured to be 34 psi at an average foam relative density of 14%.

Example 4

A filter was prepared under the same conditions as Example 1 with the composition provided in Table 5. Mulcoa 47® was used as the refractory aluminosilicate as available from C-E Minerals and the ceramic was fired at 1225° C. for 5 minutes.

TABLE 5

| Component | Wt % |
|---|---|
| refractory aluminosilicate | 54.5 |
| colloidal silica | 21.0 |
| modified bentonite | 0.8 |
| silica fume | 17.8 |
| water | 5.9 |

The resulting average hot MOR was measured to be 63 psi at an average foam relative density of 14%.

Example 5

Figure 3:
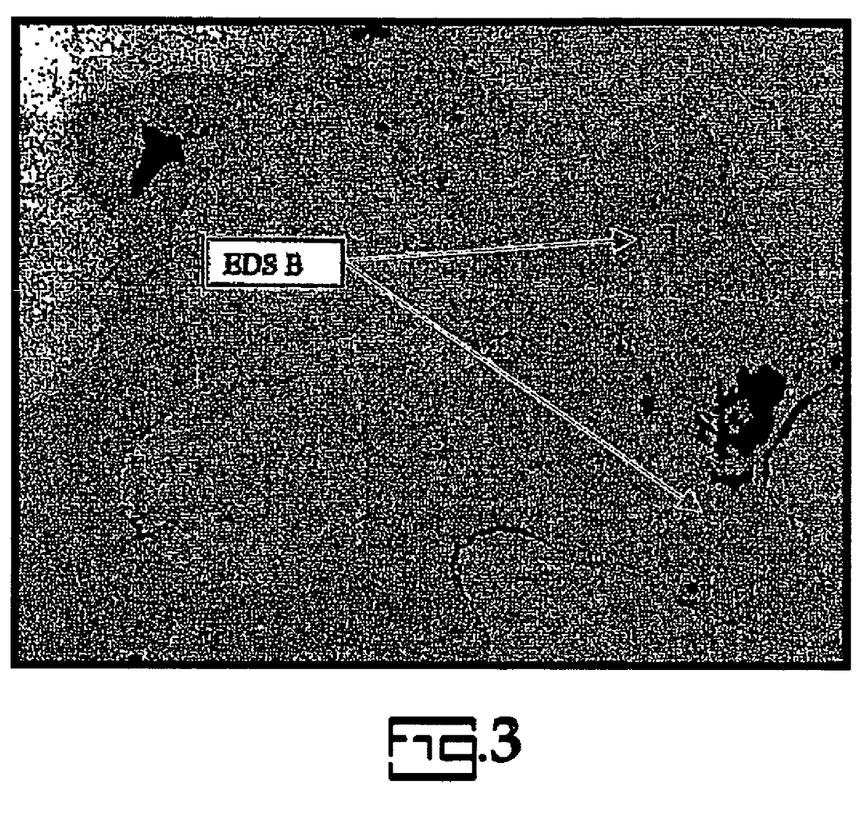
FIG. 3 is an electron microscopic, cross-sectional view of a filter of the present invention after use filtering molten iron.

Filters of the type described in Example 1 were made and tested in an iron foundry. These filters were tested in comparison with standard silicon carbide ceramic foam filters. In the test, molten grey iron was poured through a standard metal gating and filtration housing, though the test filter, and into a mold to make a standard commercial cast iron component. After metal solidification and system cool-down, the test filters were removed, cut and polished through standard metallurgical specimen preparation techniques, and examined in cross-section for evidence of liquid slag capture, retention and absorption into the micro-porosity of the filter material. FIG. 3 shows the micrograph of the sample cross-section produced. In the figure, there is evidence of liquid slag penetration into the body of the filter. In this case, the metal oxide slag captured was a mixture of metal oxide impurities (silicon, titanium, calcium, manganese and aluminum) as determined through energy dispersive spectroscopy (EDS). Evaluation of the samples from this testing indicated deeper penetration of the metal oxide slag into the microporous structure of the filter compared to that indicated with standard a silicon carbide filter run under the same operating conditions.

In a similar test inventive filters prepared as described in Example 1 and standard silicon carbide filters were tested in a standard grey iron casting application casting grey iron cylinder blocks. The foundry pattern contained two filter prints. Each individual filter print filters the iron required to fill a single cylinder block. For each test an inventive filter was placed in one filter print and a standard silicon carbide filter was placed in the other filter print as a control. Four castings were produced with each being free from inclusion defects. There was no measurable difference in pour time. The gating was cleaned and the filter print segments were removed from the gating tree for metallurgical evaluation. The filter print segment of the gating tree was sectioned to expose the filter filaments. The inventive filter print was examined for signs of mechanical failure. There was no evidence of deflection or deterioration in the filament structure. There were no signs of cracking or bowing of inventive filter thereby confirming that the filter is able to withstand mechanical and thermal stress sufficient for iron filtration applications.

Figure 4:
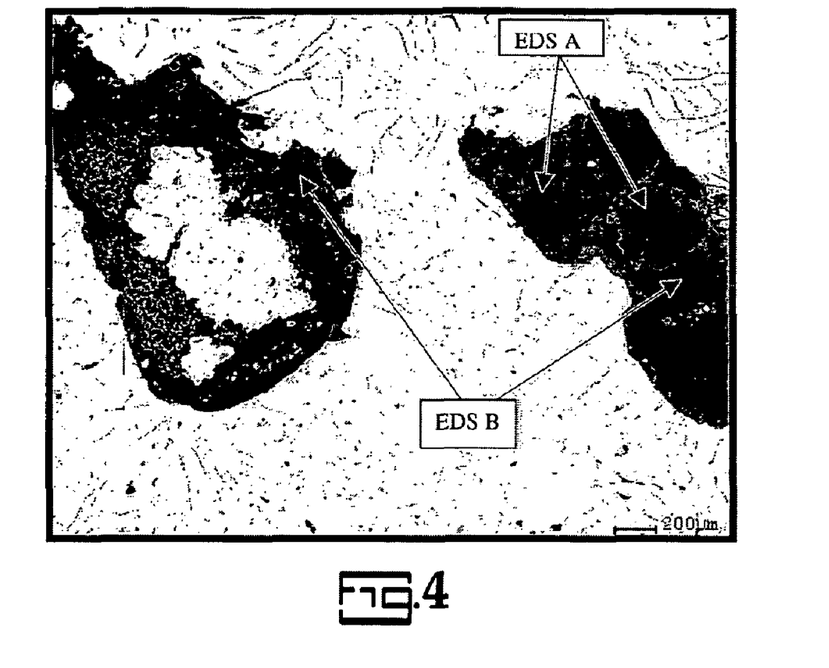
FIG. 4 is a scanning electron microscope (SEM) image.
Figure 5:
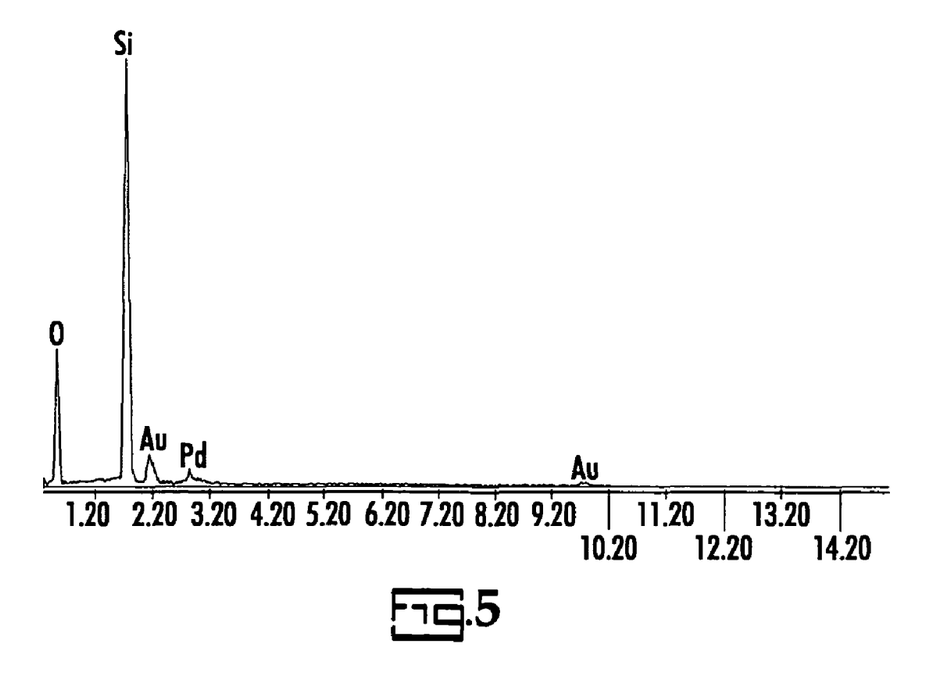
FIG. 5 is and electron dispersive spectroscopic (EDS) image.
Figure 6:
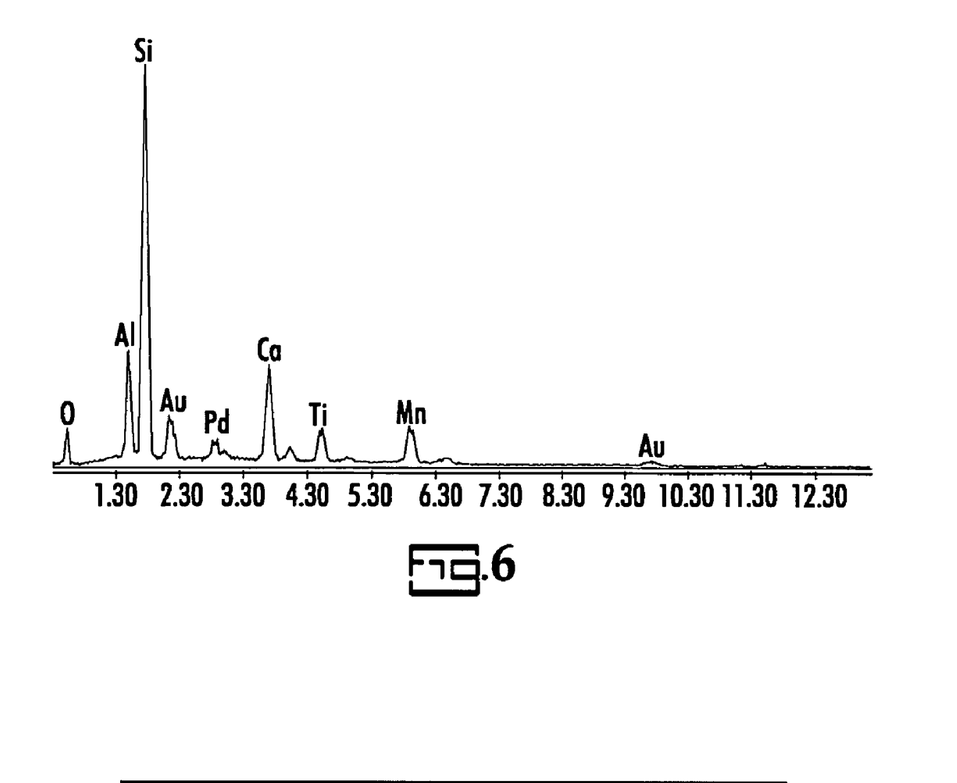
FIG. 6 is an EDS image.
Figure 7:
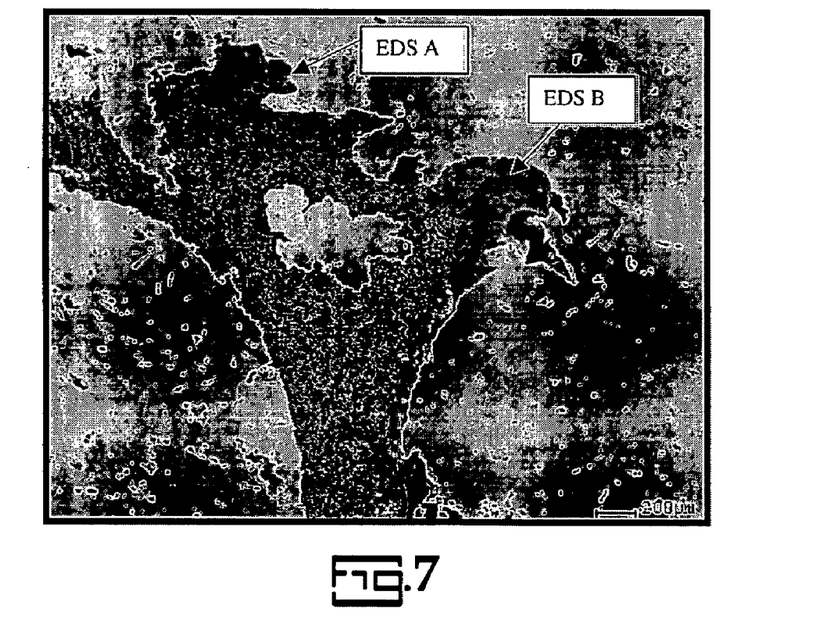
FIG. 7 is an SEM image.
Figure 8:
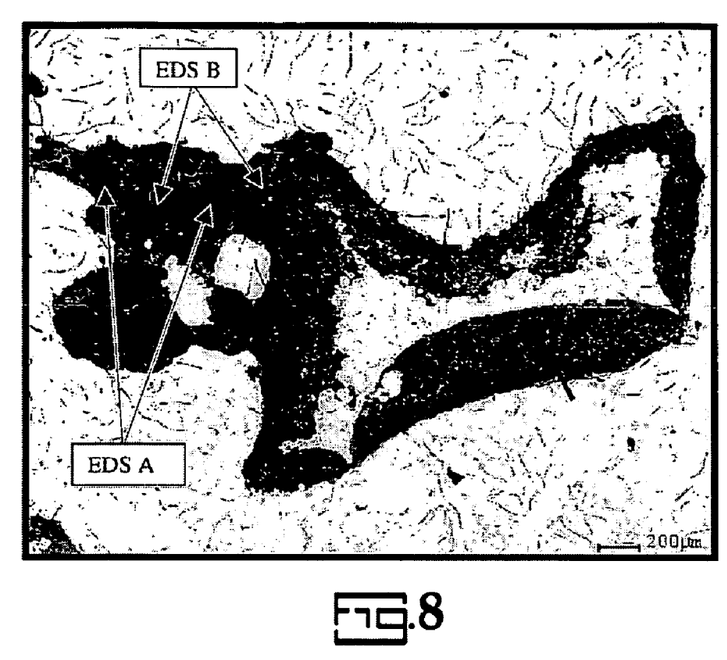
FIG. 8 is an SEM image.
Figure 9:
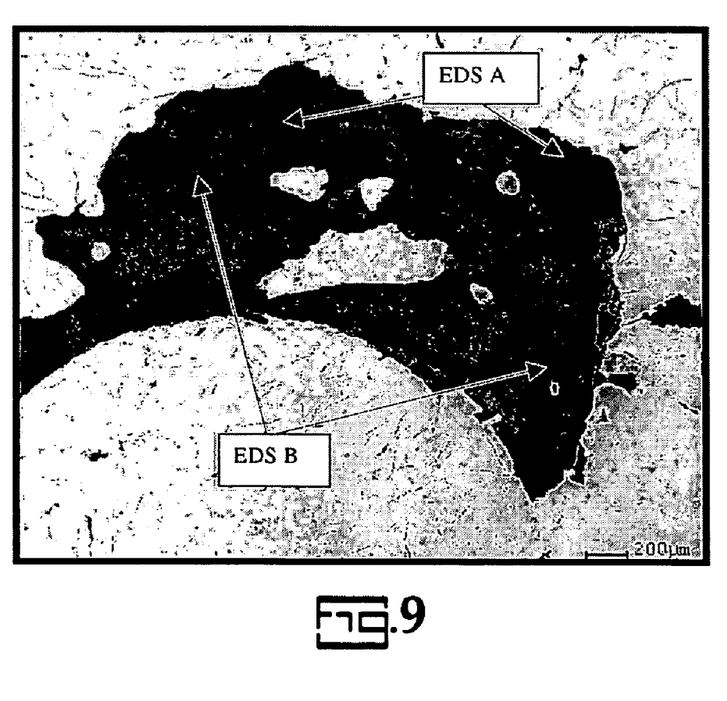
FIG. 9 is an SEM image.
Figure 10:
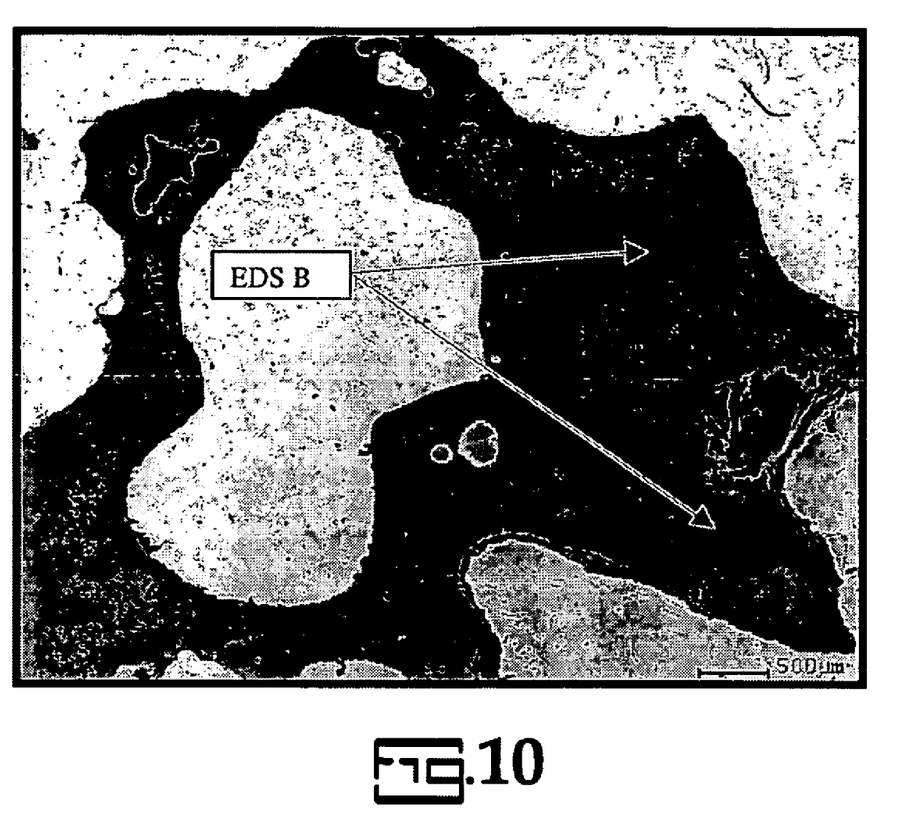
FIG. 10 is an SEM image.

The filters were examined to determine the amount and type of inclusion material captured by the filter filaments. FIGS. 4 and 10 illustrate the inclusion material captured. Examination of both the inventive and the control filter revealed a large quantity of sand grains captured on the leading edge of both filters. In some areas the filter was completely blocked by the sand grains. Examples of sand grains are clearly shown in FIG. 4 for the control filter and in FIGS. 8 and 9 for the inventive filter. FIG. 5 shows the results of an energy dispersive spectroscopy X-ray microanalysis (EDAX) confirming that the inclusion is a $SiO_2$ or silica sand particle.

The major component of the inclusion was a metal oxide slag phase shown in FIGS. 4, 7, 8, 9 and 10. This slag was examined and found to contain silicon oxide, calcium oxide, manganese oxide, aluminum oxide and titanium oxide. This slag was found in all four filters. The quantity of the oxide slag varied by location within each individual filter but this inclusion material was abundant in each filter and was easily found during the examination of each filter. In addition, this metal oxide slag contained small beads or droplets of pure iron. These droplets of iron are usually formed by the reduction of iron oxide to elemental iron by the carbon precipitate as the iron solidifies. These iron droplets were observed in both the control filters and the inventive filters. These droplets are usually created by turbulence within the gating system.

There was no significant difference in the composition of the slag captured by the control filter material versus the inventive filter material. The only difference observed in the two different ceramic materials was the depth of penetration of the metal oxide slag in the inventive filter versus the control. FIGS. 9 and 10 clearly show that the inventive filter appears to wick the slag into the filter much more effectively than the control. Penetration of the slag in the inventive filter was much more prominent than in the comparative filter. Since both the inventive and comparative filter were placed within the same mold it is not surprising that they captured similar inclusion materials. Based on visual inspection it appeared that the inventive filter had captured more inclusions than the comparative filter.

The inventive filter stood the thermal and mechanical stress of a production grey iron casting application. There was no evidence of any mechanical or chemical deterioration of the filter.

The invention has been described with particular reference to the preferred embodiments without limitation thereto. One of skill in the art would be led to embodiments which do not depart from the scope of the present invention as more specifically set forth in the claims appended hereto.

The invention claimed is:
1. A process for filtering molten iron comprising:
preparing a ceramic foam filter by the steps of:
preparing a ceramic precursor comprising:
35-70 wt % refractory aluminosilicate;
10-30 wt % colloidal silica;
0-2 wt % bentonite;
0-35 wt % fuming silica;
0-10 wt % pore formers; and
the balance being a solvent;

impregnating an organic foam with said ceramic precursor;
heating said impregnated organic foam to a temperature sufficient to volatilize said organic foam and sinter said ceramic precursor to form a filter; and
passing molten iron through said filter wherein FeO slag is retained by said filter.

2. The process for filtering molten iron of claim 1 wherein said pore formers are hollow spheres.

3. The process for filtering molten iron of claim 2 wherein said hollow spheres have a diameter of 20 to 150 µm.

4. The process for filtering molten iron of claim 1 wherein said ceramic precursor comprises 40-60 wt % refractory aluminosilicate.

5. The process for filtering molten iron of claim 4 wherein said ceramic precursor comprises 50-60 wt % refractory aluminosilicate.

6. The process for filtering molten iron of claim 1 wherein said ceramic precursor comprises 10-23 wt % colloidal silica.

7. The process for filtering molten iron of claim 1 wherein said ceramic precursor comprises 0-1.5 wt % bentonite.

8. The process for filtering molten iron of claim 7 wherein said ceramic precursor comprises 0.8 wt % bentonite.

9. The process for filtering molten iron of claim 1 wherein said ceramic precursor comprises 0-20 wt % fumed silica.

10. The process for filtering molten iron of claim 9 wherein said ceramic precursor comprises 10-20 wt % fumed silica.

11. The process for filtering molten iron of claim 1 wherein said solvent is water.

12. The process for filtering molten iron of claim 1 wherein said filter has a hot MOR of 25 to 120 psi.

13. The process for filtering molten iron of claim 12 wherein said filter has a relative density which is about 12% of theoretical density.

14. The process for filtering molten iron of claim 1 wherein said filter has a relative density of 8-18%.

15. The process for filtering molten iron of claim 1 wherein said bentonite is modified bentonite.

16. A process for filtering molten iron comprising:
preparing a ceramic foam filter by the steps of:
preparing a ceramic precursor comprising:
40-60 wt % refractory aluminosilicate;
10-30 wt % colloidal silica;
0-2 wt % bentonite;
10-20 wt % fuming silica;
0-10 wt % pore formers; and
the balance being a solvent;
impregnating an organic foam with said ceramic precursor;
heating said impregnated organic foam to a temperature sufficient to volatilize said organic foam and sinter said ceramic precursor to form a filter;
passing molten iron through said filter wherein FeO slag is retained by said filter; and
wherein said filter has a hot MOR of 25 to 120 psi.

\* \* \* \* \*